United States Patent [19]

Kobayashi et al.

[11] Patent Number: 4,512,486
[45] Date of Patent: Apr. 23, 1985

[54] STOPPER ASSEMBLY FOR MEDICAL LIQUID CONTAINER AND METHOD AND APPARATUS FOR MANUFACTURING THE SAME

[75] Inventors: Hiroshi Kobayashi, Abiko; Michio Kousaka, Tokyo, both of Japan

[73] Assignee: Toyo Seikan Kaisha Limited, Tokyo, Japan

[21] Appl. No.: 428,426

[22] Filed: Sep. 29, 1982

[30] Foreign Application Priority Data

Nov. 16, 1981 [JP] Japan ............................ 56-183382

[51] Int. Cl.³ ...................... B65D 51/20; B65D 41/50; B65D 47/36
[52] U.S. Cl. .................................. 215/249; 222/541; 215/251; 215/305
[58] Field of Search ............... 215/249, 251, 296, 297, 215/298, 247, 250, 305; 222/541, 543

[56] References Cited

U.S. PATENT DOCUMENTS

| | | | |
|---|---|---|---|
| 3,088,615 | 5/1963 | Mumford et al. | 215/249 |
| 3,325,031 | 6/1967 | Singier | 215/247 |
| 3,871,545 | 3/1975 | Bereziat | 215/249 |
| 3,888,377 | 6/1975 | Stadler | 215/249 |
| 3,923,179 | 12/1975 | Choksi et al. | 215/251 X |
| 4,011,961 | 3/1977 | Widen et al. | 215/232 |
| 4,111,324 | 9/1978 | Winchell | 215/251 X |
| 4,254,884 | 3/1981 | Maruyama | 215/232 |
| 4,320,861 | 3/1982 | Rieke et al. | 222/541 |

FOREIGN PATENT DOCUMENTS

| | | | |
|---|---|---|---|
| 2716447 | 10/1978 | Fed. Rep. of Germany | 215/249 |
| 1437686 | 6/1976 | United Kingdom | 215/251 |

*Primary Examiner*—Allan N. Shoap
*Assistant Examiner*—Bryon Gehman
*Attorney, Agent, or Firm*—Armstrong, Nikaido, Marmelstein & Kubovcik

[57] ABSTRACT

A stopper assembly for a medical liquid container comprises an inner cylindrical stopper member formed of a plastic material, a rubber plug member hermetically contained in a chamber formed within the inner stopper member by first and second partition walls. An outer cylindrical stopper member formed of a plastic material is hermetically welded around the inner stopper member. An annular score is formed in the first partition wall with a pulling member being formed at a region enclosed by the annular score. A flange is formed at the base portion of the stopper assembly at which the stopper assembly is joined to a mouth of the medical liquid container. Further disclosed are method and apparatus for manufacturing the stopper assembly.

3 Claims, 19 Drawing Figures

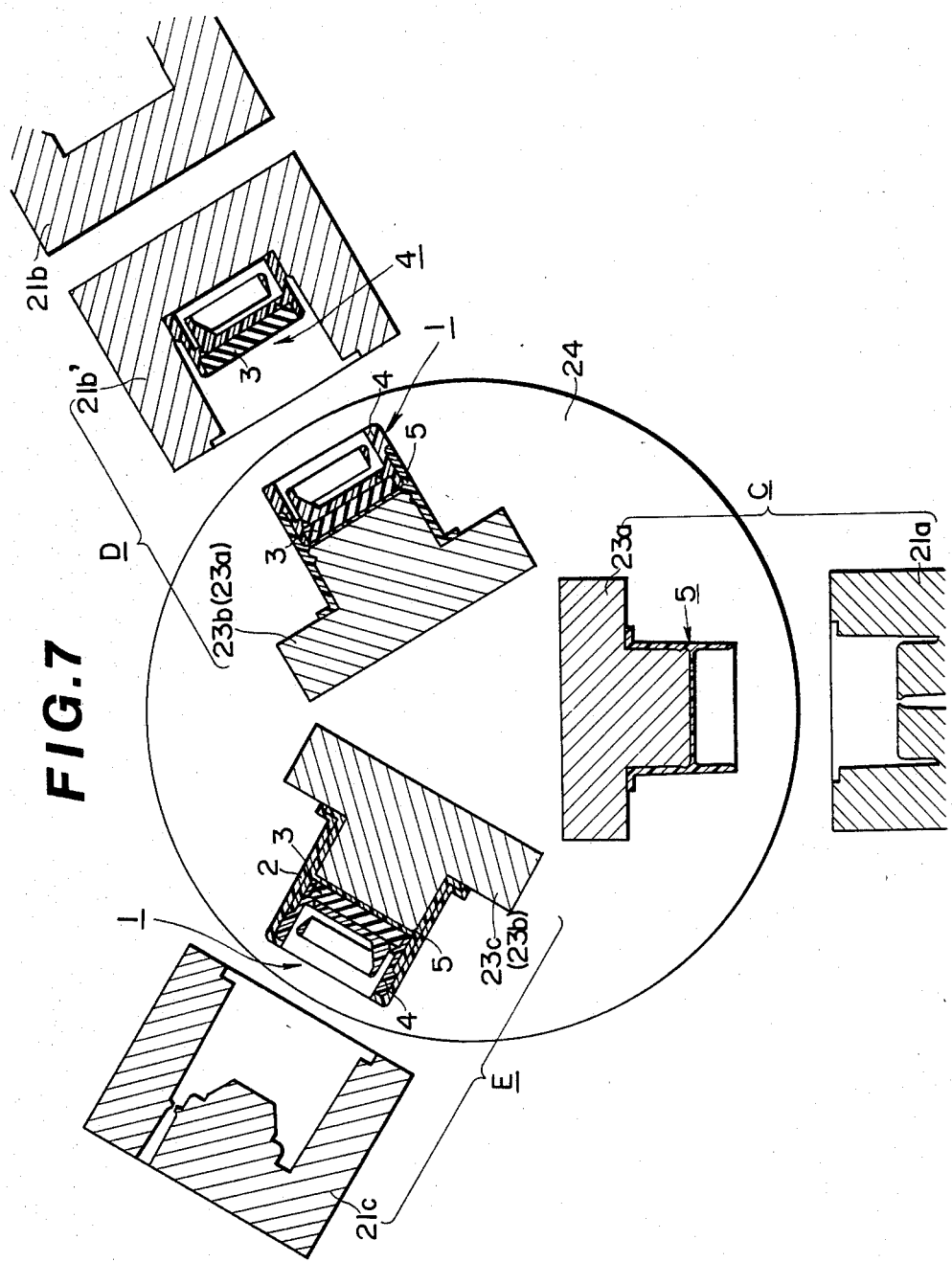

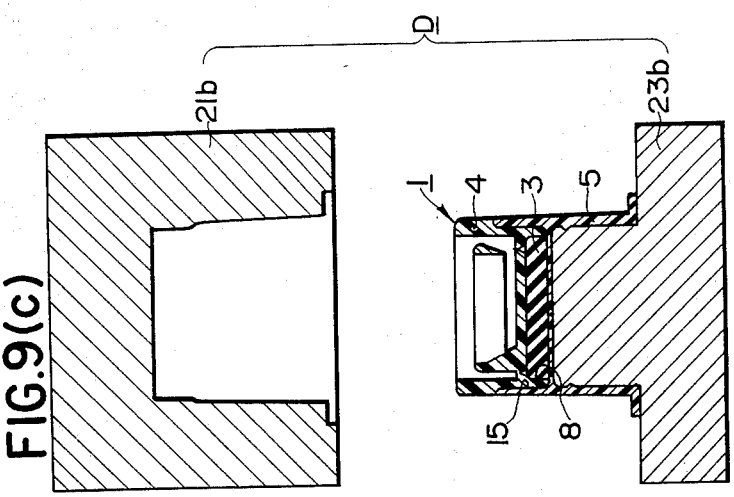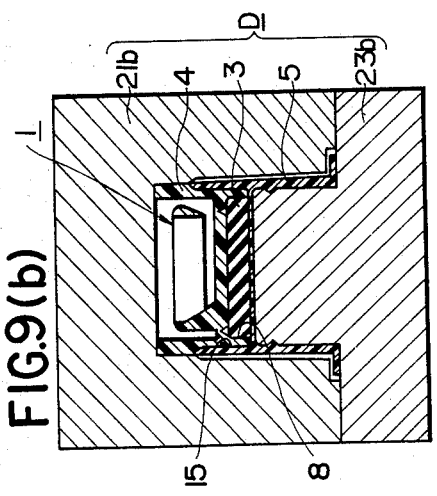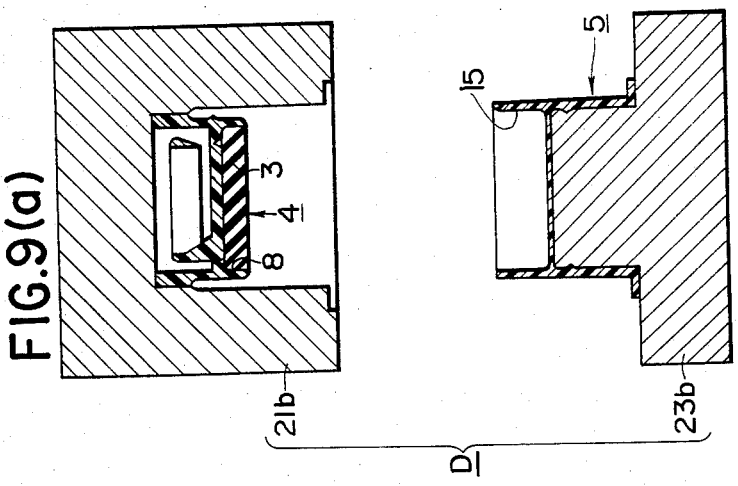

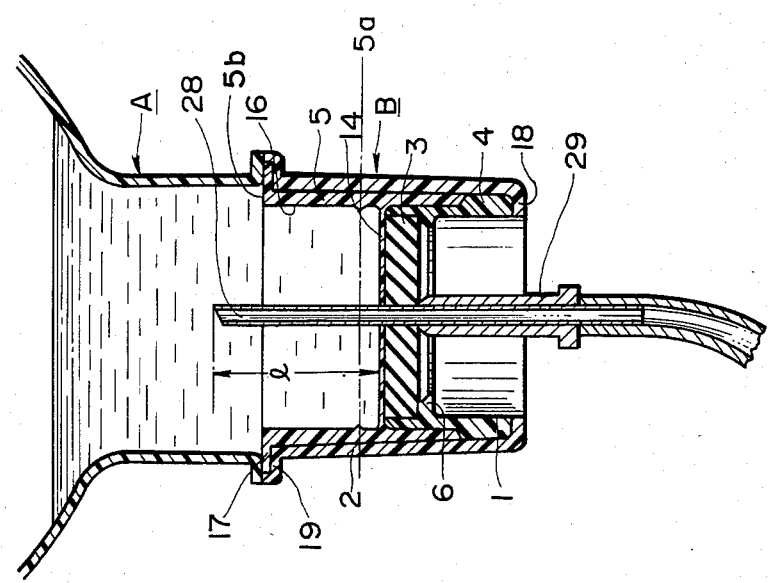
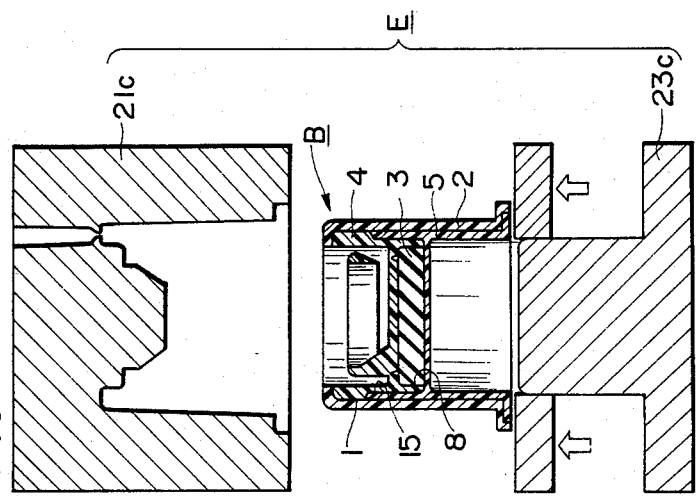

STOPPER ASSEMBLY FOR MEDICAL LIQUID CONTAINER AND METHOD AND APPARATUS FOR MANUFACTURING THE SAME

BACKGROUND OF THE INVENTION

1. Field of the Invention

The present invention relates generally to medical liquid container which is used to store and administer parenteral solutions such as dextrose, saline and the like to a patient and, more particularly, to a stopper assembly for the medical liquid container.

2. Description of the Prior Art

Heretofore, many of the medical liquid containers are made of a glass bottle. For plugging the glass bottle, the glass bottle is first cleaned and filled with a liquid, which is followed by the plugging of a rubber stopper which has previously undergone sterilization process. Subsequently, the rubber stopper is sealed by clinching a cap of aluminium. The glass bottle thus hermetically sealed is subsequently subjected to sterilization. Finally, the bottle is capped with a plastic cover and enclosed by a contractable sheet of vinyl chloride. The prior art container suffers a disadvantage in that the rubber stopper is likely to contact with the liquid, whereby bleeds produced on the rubber material may be admixed to the liquid. Further, the plugging process is tedious and troublesome, because many components or members as well as a large number of plugging and sealing steps are required.

There are also known the medical liquid container constituted by a plastic bottle. For plugging the plastic bottle, the plastic bottle is first cleaned and filled with a liquid. Thereafter, a circular stopper also formed of a plastic material is heat-welded to an openings of the plastic bottle and then sterilized. Next, a rubber stopper or plug is fitted in the circular plastic stopper and capped with a cover sheet of a plastic material. Finally, the bottle is hermetically covered by a contractable sheet of vinyl chloride. This medical liquid bottle made of plastic material is very disadvantageous in that the rubber plug which is to be penetrated by a needle for delivering the liquid to a patient and thus requires cleanliness does not undergo the sterilizing treatment. Accordingly upon using the bottle, the region of the stopper or plug at which the needle is inserted must beforehand be cleaned with gauze impregnated with alcohol or the like. Further, a relatively large number of the sealing and plugging members as well as troublesome steps are required, to another disadvantage.

Further, in the case of the medical liquid bottle formed of glass, foreign liquid pollutants may undesirably enter the bottle by way of the aluminium cap and the rubber stopper due to difference in pressure between the exterior and the interior of the bottle produced when the glass bottle is exposed to a high temperature for sterilization.

In the case of the plastic bottle, the plastic stopper member and the rubber plug are simply fitted to each other. Accordingly, upon sterilization at a high temperature, foreign liquid may enter the plastic bottle through the contacted boundary of the plastic stopper and the rubber plug or foreign liquids may stay therebetween to corrode the rubber plug. Further, since the individual members are formed separately and assembled individually, the manufacturing is not suited for mass production.

SUMMARY OF THE INVENTION

It is the primary object of the present invention to provide a stopper assembly for a medical liquid container which is substantially immune to the disadvantages of the prior art stoppers described above.

It is another object of the present invention to provide a stopper assembly for a medical liquid container in which a rubber plug through which a needle is inserted is held in a hermetically sealed state, to thereby make it unnecessary to clean the rubber plug with gauze impregnated with alcohol or the like upon using the container.

It is a further object of the invention to provide a stopper assembly for a medical liquid container which can be manufactured inexpensively in a facilitated manner.

It is still another object of the invention to provide a method of manufacturing the stopper assembly.

It is still a further object of the present invention to provide an apparatus for carrying out the method.

In view of the above and other objects which will become apparent as description proceeds, there is provided according to an aspect of the present invention a stopper assembly for a medical liquid container, comprising an inner cylindrical stopper member formed of a plastic material, a rubber plug member hermetically contained in a chamber formed within the inner stopper member by first and second partition walls, the first partition wall being provided with an annular score, an outer cylindrical stopper member formed of a plastic material and hermetically welded around the inner stopper member, a pulling member formed in the first partition wall at a region enclosed by the annular score.

According to another aspect of the invention, there is provided a method of manufacturing a stopper assembly for a medical liquid container, comprising steps of forming a first inner stopper element having a first partition wall under which a first open chamber accommodating a plug member of rubber is formed, the first partition wall having an annular score formed in a surface defining the chamber, forming a second inner stopper element which has a second partition wall defining a second open chamber, joining together the first and second inner stopper elements for constituting an inner stopper member in such a manner that the first open chamber accommodating therein the rubber plug is snugly fitted in the second open chamber to thereby form a hermetically closed chamber in which the rubber plug member is sealed, and forming an outer stopper member which is simultaneously welded around the inner stopper member.

According to a further aspect of the invention, there is provided an apparatus for carrying out the above method, comprising a first station including a movable mold half and a fixed mold half which constitute a first mold for forming the second inner stopper element, a second station including a movable mold half and a fixed mold half which constitute a second mold for joining the first inner stopper element to the second inner stopper element to thereby constitute the inner stopper member with the rubber plug member being hermetically placed within the chamber, and a third station including a movable mold half and a fixed mold half which constitute a third mold for forming the outer stopper member welded to and around the inner stopper member, wherein all of the movable mold halves are mounted with equidistance on an axially movable and rotatable table in a circular array in opposition to the fixed mold halves, respectively, so that the movable mold halves are successively and intermittently moved from the first station to the second station and hence to the third station through corresponding rotation of the table, the movable mold halves carrying the element and the member formed at the stations.

BRIEF DESCRIPTION OF THE DRAWINGS

FIG. 7 is a view taken along line VII—VII in FIG. 5 and showing in longitudinal sections movable mold halves and fixed mold halves provided at the first to the third stations, respectively;

FIGS. 8a, 8b and 8c illustrate in sectional views of steps of forming a lower inner stopper element of the stopper assembly by means of the first mold provided at the first station;

FIGS. 9a, 9b and 9c illustrate in sectional views the steps of joining the upper inner stopper element and the lower inner stopper element by means of the second mold provided at the second station;

FIG. 13 shows in a longitudinal section a medical liquid container equiped with the inventive stopper assembly in the state being used.

DETAILED DESCRIPTION OF THE PREFERRED EMBODIMENTS

Now, the invention will be described in conjunction with a preferred embodiment thereof by referring to the accompanying drawings.

Figure 1:
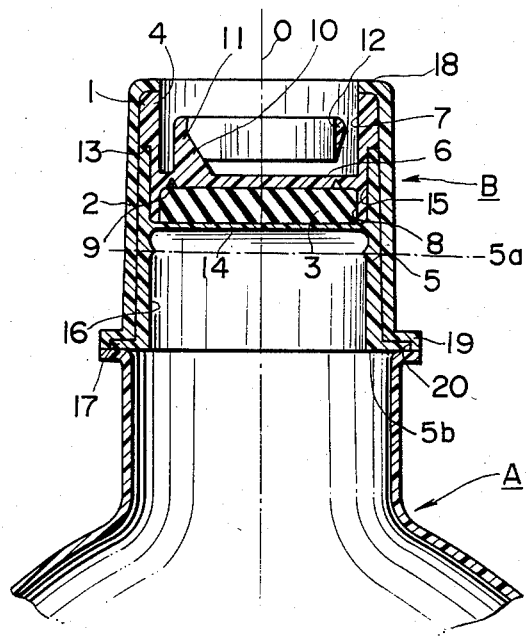
FIG. 1 shows in a longitudinal sectional view a plastic bottle plugged with a stopper assembly according to an embodiment of the present invention.

Referring to FIG. 1, a medical liquid container includes a bottle A having a mouth portion hermetically closed by a stopper assembly B constructed according to an exemplary embodiment of the invention. The bottle A as well as the stopper B is formed of a synthetic resin material which is capable of withstanding a high temperature at which sterilization of the medical liquid container is effected. The stopper assembly B implemented ultimately in a single integral unit comprises generally an inner stopper member 1, an outer stopper member 2 and a plug member 3 made of rubber.

Figure 2:
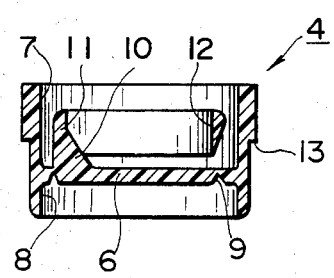
FIG. 2 shows in a longitudinal sectional view an upper inner stopper element constituting a part of the stopper assembly.
Figure 3:
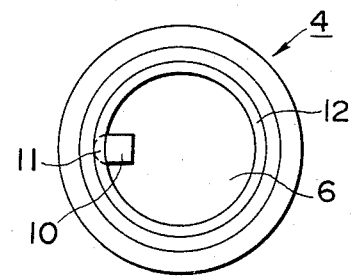
FIG. 3 is a top plan view of the upper inner stopper element.
Figure 4:
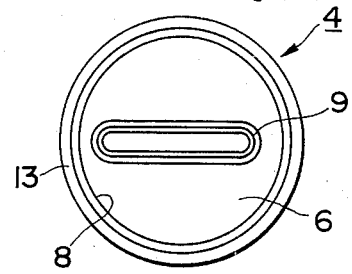
FIG. 4 is a bottom plan view of the same.

Describing in detail the structure of the stopper assembly B by also referring to FIGS. 2 to 4, the inner stopper member 1 is constituted by two parts, that is, an upper inner stopper element 4 and a lower inner stopper element 5 joined together with ends abutting each other in the direction along the center axis O. The upper inner stopper element 4 has a partition wall 6 formed simultaneously with the inner cylindrical surface thereof. The cylindrical inner space of the upper inner stopper element 4 is thus divided into an upper chamber 7 and a lower chamber 8 by the partition wall 6. A score 9 in a form of an elongated circle is formed in the lower surface of the partition wall 6 (FIG. 4) and defines an enclosed area preserved for insertion of a needle. On the other hand, thre is integrally formed on the upper surface of the partition wall 6 a rib 10 at an appropriate location inside the score line 9 (FIG. 3). A supporting base portion 11 having a pull ring 12 is integrally formed with the rib 10. The region of the partition wall 6 enclosed by the score line 9 can be readily removed by pulling the ring 12 outwardly by means of a finger inserted therein, to thereby expose a portion of the rubber plug member 3 which is to be penetrated by the needle, as will be described hereinafter. Further, an offset or shoulder portion 13 is formed in the outer peripheral surface of the upper inner stopper element 4 so that the annular upper end of the lower inner stopper element 5 bears against the shoulder portion 13 when the upper and the lower inner stopper elements 4 and 5 are joined together in the end abutting manner.

The upper inner stopper element 4 may be formed through extrusion of a resin composition containing polypropylene as a main component and additives such as copolymer of ethylene and propylene and calcium carbonate or the like inorganic material. In this connection, it should be mentioned that if the upper inner stopper element 4 is formed solely of polypropylene which inherently exhibits a high tensile strength, it will become difficult to rupture the partition wall 6 along the score 9, although the stopper element 4 can well withstand the high temperature for sterilization by heating. For this reason, the upper inner stopper element 4 should preferably be made of the resin composition mentioned above so that requirements for the high heat-resistance and the facilitated removal of the partition wall 6 can both be satisfied.

The lower inner stopper element 5 which is to be integrally joined with the upper inner stopper element 4 mentioned above also has a thin partition wall 14 formed simultaneously with the cylindrical inner surface thereof. The cylindrical inner space defined by the lower inner stopper element 5 is thus divided into an upper chamber 15 and a lower chamber 16 by the partition wall 14. In this conjunction, it is to be noted that the upper chamber 15 cooperates with the lower chamber 8 of the upper inner stopper element 4 to define a chamber for accommodating therein the rubber plug member 3. It should further be noted that the partition wall 14 is disposed at a level higher than the peripheral center 5a of the lower stopper element 5 so that a large space accrues between the partition wall 14 and the bottom end 5b of the lower stopper element 5. The lower inner stopper element 5 has an outer annular flange 17 formed at the lower end 5b and extending horizontally as viewed in FIG. 1. The bottom surface of the outer flange 17 is heat-welded to the upper edge portion of the mouth of the plastic bottle A to thereby seal hermetically the mouth of the plastic bottle A.

The cylindrical outer stopper member 2 which is tightly and hermetically welded to the outer peripheral surfaces of the upper and lower inner stopper elements 4 and 5 joined together in the manner described above has an annular inner flange 18 integrally formed at the top end thereof and extending horizontally inwardly and an annular outer flange 19 integrally formed at the bottom end and extending horizontally outwardly, wherein the outermost peripheral portion of the outer flange 19 is bent downwardly, as indicated at 20. The upper inner flange 18 serves to prevent the upper inner stopper element 4 of the inner stopper member 1 from being inadvertently removed upwardly, while the lower outer flange 19 having the downwardly depending bent portion 20 is effective to hold securely the lower inner stopper element 5 at the outer flange portion 17 thereof by enclosing and clamping the latter.

The rubber plug member 3 is tightly sealed within the chamber defined by both the lower chamber 8 formed in the upper inner stopper element 4 and the upper chamber 16 formed in the lower stopper element 5 and hermetically shut out from the ambient.

Figure 5:
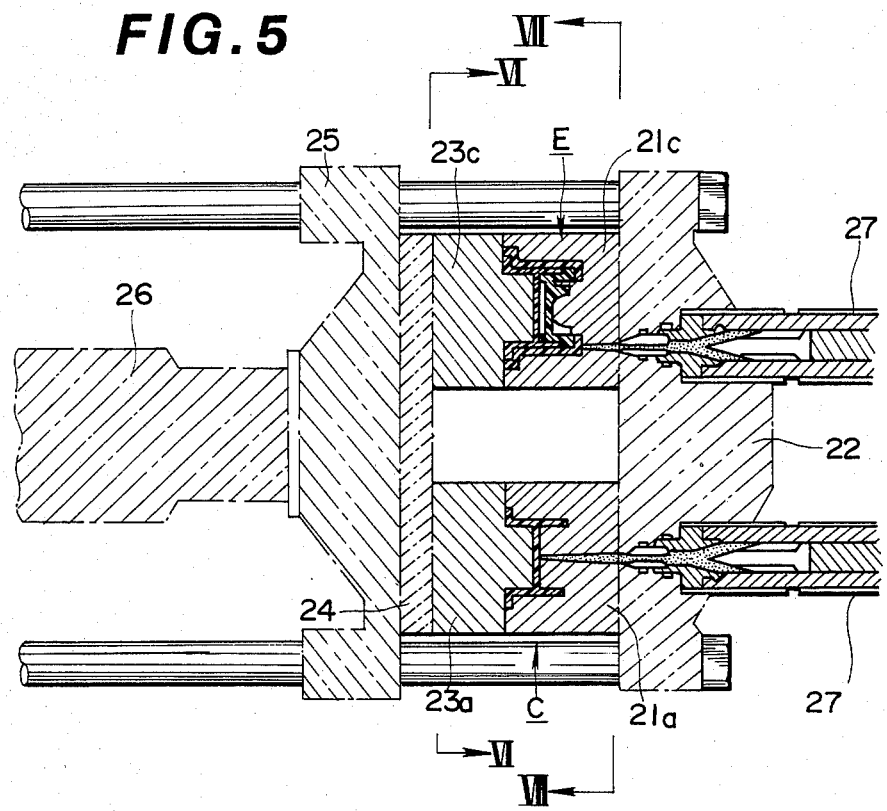
FIG. 5 is a longitudinal sectional view taken along line V—V in FIG. 6 and shows a three-stage injection molding machine for carrying out a method of manufacturing the stopper assembly according to the invention.
Figure 6:
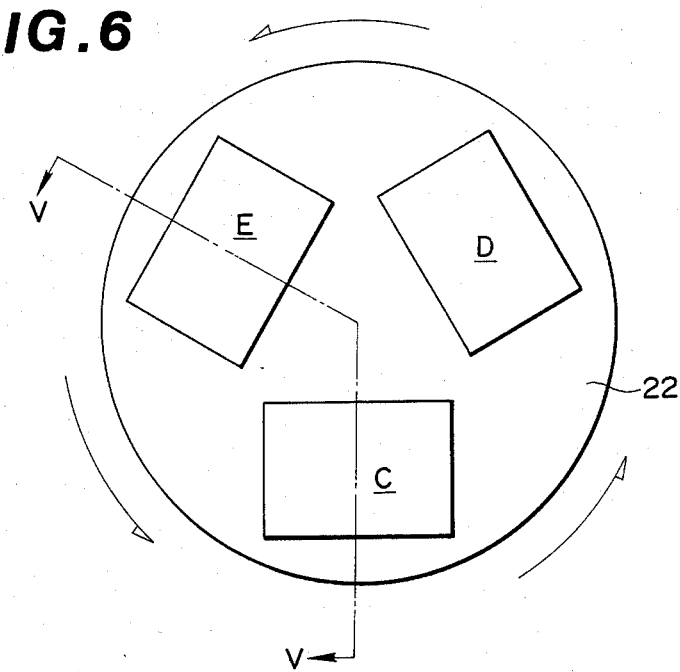
FIG. 6 is a view taken along line VI—VI in FIG. 5 and illustrating a positional relationship of the molding stations provided in the three-stage injection molding machine.

FIG. 5 shows a three-stage injection molding machine adapted for carrying out the method of manufacturing the stopper assembly for the medical liquid container according to a preferred embodiment of the invention. Further, FIGS. 6 and 7 show an array of individual metal molds constituting first to third stages or stations, respectively, of the three-stage injection molding machine as viewed toward the planes taken along the lines VI—VI and VII—VII, respectively, in FIG. 5, wherein the molds are shown in longitudinal sectional views at respective positions. Referring to FIG. 7, a reference letter C denotes generally the first mold of the first injection molding stage or station for molding the lower inner stopper element 5 of the inner stopper member 1, a reference letter D designates generally the second mold of the second station for fitting and joining the lower inner stopper element 5 formed by the first mold C with the upper inner stopper element 4 incorporating therein the rubber plug member 3 preformed by other appropriate means, and a reference numeral E denotes generally the third mold of the third injection molding stage or station for forming the outer stopper member 2 welded to the inner stopper member 1 constituted by the upper inner stopper element 4 and the lower inner stopper element 5 which have been integrally joined together by means of the second mold D. Referring to FIG. 5 in combination with FIG. 7, reference symbols 21a, 21b and 21c denote fixed mold halves of the first, second and the third molds, respectively, which mold halves are fixedly disposed on a stationary table 22 with a predetermined inter-mold distance in a circular array, while reference letters 23a, 23b and 23c denote movable mold halves of the first, second and the third molds, respectively, wherein the movable mold halves 23a, 23b and 23c are disposed at respective predetermined positions on a rotatable plate 24 which is adapted to be moved toward and away from the stationary table 22 in parallel thereto. It will readily be appreciated that these movable mold halves 23a, 23b and 23c cooperate with the fixed or stationary mold halves 21a, 21b and 21c to thereby constitute the first to the third molds C, D and E, respectively. By the way, although the fixed and the movable mold halves 21a and 23a constituting the first mold C of the first station, the stationary and movable mold halves 21b and 23b constituting the second mold D of the second station, and the stationary and movable mold halves 21c and 23c constituting the third mold E of the third station are shown in the longitudinal sectional views in FIG. 7, it will be noted that these stationary and movable mold halves are mounted on the stationary table 22 and the rotatable plate 24, respectively, in such a disposition that the longitudinal axes of the molds C, D and E extend in reality in parallel with the center line passing through the centers of the stationary table 22 and the rotatable plate 24 perpendicularly thereto, as will be seen from FIG. 5. The rotatable plate or table 24 having the movable mold halves 23a, 23b and 23c mounted thereon is in turn mounted rotatably on a movable table 25 which is disposed axially movably at the side of the rotatable table 24 in opposition to the stationary table 22. In FIG. 5, a reference numeral 26 denotes a mold clamping ram connected to the movable plate 25, and a reference numeral 27 denotes screw type extruders for injecting melted synthetic material into the first and third molds C and E through nozzles, respectively.

Figure 8A:
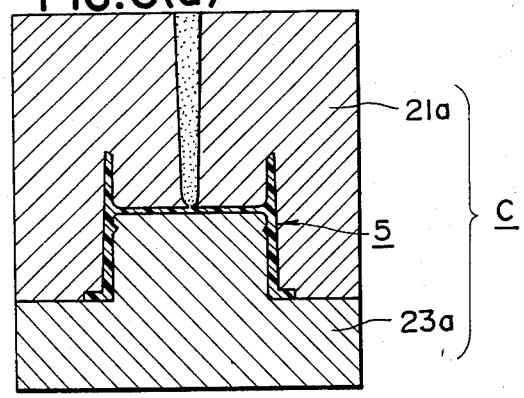
Figure 8B:
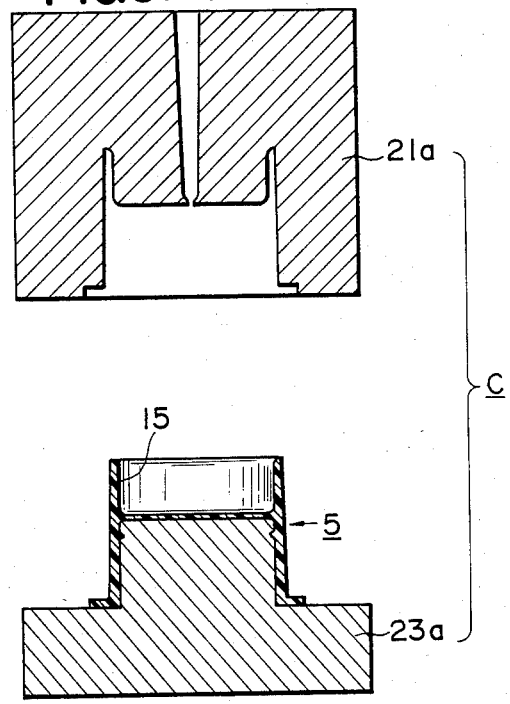

Referring to FIGS. 8 to 12 which illustrate steps of manufacturing the stopper assembly for the medical liquid container by making use of the injection molding machine of the arrangement described above, when the lower inner stopper element 5 has been formed by the first mold C into which the melted synthetic material is injected through the screw extruder 27 as illustrated in FIG. 8 at (a), the movable mold half 23a of the first mold C is moved away from the counterpart 21a in the axial direction through the movable table 25, as shown in FIG. 8 at (b). Upon displacement of the movable mold half 23a from the fixed counterpart 21a, the lower inner stopper element 5 as molded is held, as it is, within the movable mold half 23a with the upper chamber 15 of the stopper element 5 being directed towards the fixed mold half 21a. In succession to the step illustrated in FIG. 8 at (b), the movable mold half 23a holding therein the lower inner stopper element 5 is rotated for a predetermined angle by means of the rotatable plate 24 to be stopped at the position corresponding to the second stage or station.

In this way, the movable mold half 23a of the first mold C now serves as the movable mold half 23b for the second mold D. Reference is to be made to FIG. 9 at (a). At that time, the upper inner stopper element 4 having the rubber plug member 3 as preformed by some appropriate means within the lower chamber 8 is so fitted and located within the fixed mold half 21b of the second station that the lower chamber 8 is positioned in opposition to the upper chamber 15 of the lower inner stopper element 5 held by the movable mold half 23b. Subsequently, the movable mold half 23b comes close to the stationary mold half 21b under the action of the movable plate 25, to clamp together the movable and stationary mold halves 23b and 21b, whereby the lower chamber 8 having the rubber plung member 3 accommodated therein is snugly inserted into the upper chamber 15 formed in the lower inner stopper element 5. Thus, the upper inner stopper element 4 and the lower inner stopper element 5 are joined together to form the integral inner stopper member 1 in which the rubber plug member 3 is hermetically sealed, as illustrated at (b) in FIG. 9. Thereafter, the movable mold half 23b with the inner stopper member 1 being held thereon is moved away from the fixed counterpart 21b through the movable plate 25. Refer to FIG. 9 at (c).

Figure 10:
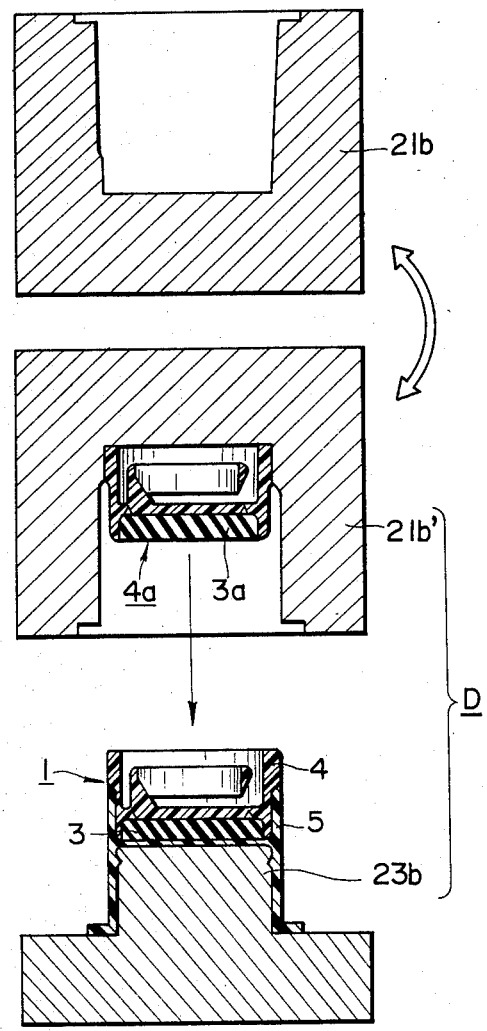
FIGS. 10 and 11 show exemplary manners in which the upper inner stopper element is transferred to the movable mold half at the second station.
Figure 11:
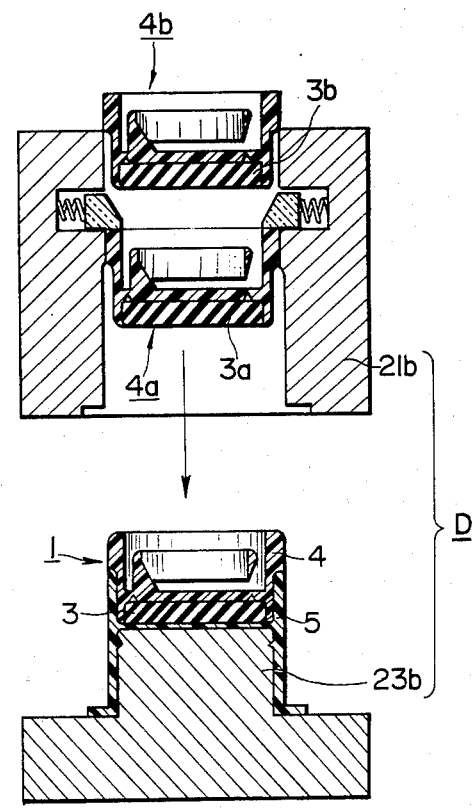

Referring to FIGS. 10 and 11, there are illustrated, by way of example, manners in which the upper inner stopper element 4 having the rubber plug member 3 is delivered to the fixed mold half 21b at the second station D. In the case of the example shown in FIG. 10, a pair of fixed mold halves 21b and 21b' having mold openings oriented in reverse directions are positioned in opposition to the movable mold 23b. After the upper inner stopper element 4 has been transferred from the fixed mold half 21b to the movable mold half 23b at the clamping step illustrated in FIG. 9 at (b), the other fixed mold half 21b' receiving therein another upper inner stopper element 4a preformed by other suitable means is brought to the operative position through rotation indicated by a hollow arrow. In the case of the example shown in FIG. 11, only a single fixed mold half 21b is employed into which the upper inner stopper elements 4a, 4b and so forth are successively supplied one by one and disposed in the standby state ready for being transferred to the movable counterpart 23b.

Figure 12C:
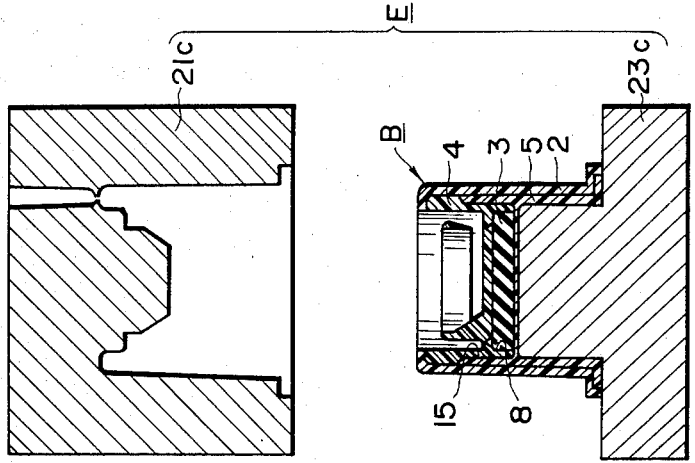
FIGS. 12a, 12b and 12c illustrate in sectional views the steps of bonding an outer stopper member in a molten state to the inner stopper member and subsequently knocking out the finished stopper assembly.
Figure 12B:
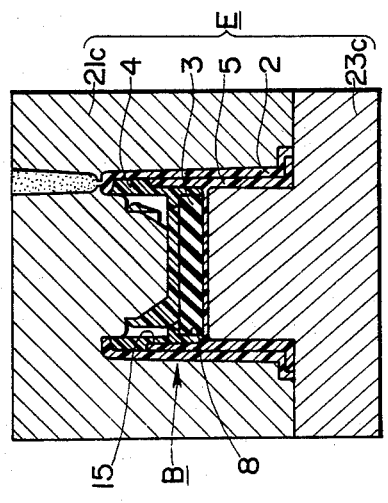
Figure 12A:
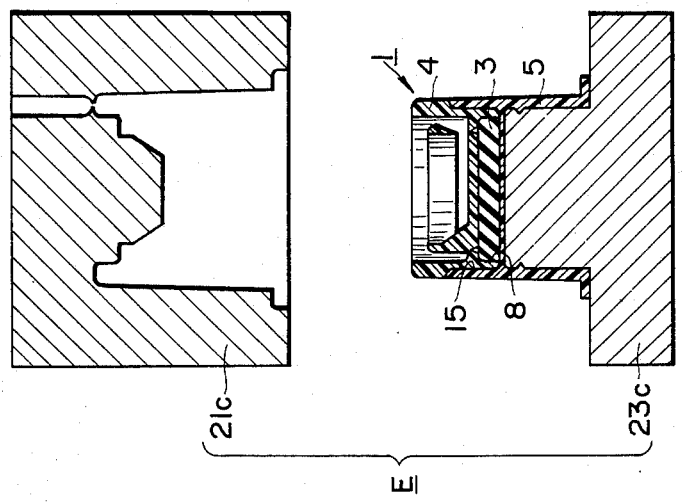

When the inner stopper member 1 has been formed at the second station in the manner described above, the movable mold half 23b having the finished inner stopper member 1 adhered thereto is moved to the third molding station by rotating correspondingly the rotatable plate 24 to be positioned in opposition to the fixed mold half 21c of the third station. Thus, the movable mold half 23b rotated to the third station serves as the movable mold half 23c to cooperate the fixed counterpart 21c of the third mold E. Refer to FIG. 12 at (a). The movable mold half 23c thus indexed comes close to the fixed counterpart 21c. After clamping both the mold halves 23c and 21c, melted synthetic resin material is injected into the closed mold at the vicinity of the upper end portion of the inner stopper element 4, to thereby form the outer stopper member 2 welded to the outer peripheral surface of the inner stopper member 1. Refer to FIG. 12, (b). Subsequently, the movable mold half 23c is moved away from the fixed counterpart 21c with the finished stopper assembly B being held with the movable mold half 23c. Refer to FIG. 12 at (c). When the stopper assembly B thus finally molded is knocked out from the movable mold half 23c as shown in FIG. 12 at (d), one cycle of the manufacturing steps has been completed. By repeating the manufacturing cycle elucidated above, the stopper assembly B according to the invention can be fabricated on a mass production base.

The stopper assembly B constituted by the inner stopper member 1, the outer stopper member 2 and the rubber plug member 3 sealed in the inner stopper member 1 formed integrally through the continuous molding process then undergoes a gas, hot water or steam sterilization process. Of course, the rubber plug member 3 has been beforehand sterilized. The stopper assembly B is disposed on a mouth portion of a cleaned plastic bottle A filled with a medical liquid, so that the stopper assembly B is erected and protrudes outwardly. By welding the flange 17 of the stopper assembly B to the mouth edge of the plastic bottle A through heat sealing, the stopper assembly B is hermetically secured to the plastic bottle or container A. The finished liquid in the bottle sealed by the stopper assembly B is subjected to another sterilization process, whereby the finally finished product is obtained.

Referring to FIG. 13, a medical liquid container is shown as fitted with the stopper assembly B according to the invention. For the use of the container or bottle, the pull ring 12 is forcively erected by a finger inserted therein. Then, a region of the partition wall 6 enclosed by the ellipsoidal score line 9 is ruptured away, whereby a corresponding portion of the rubber plug member 3 is exposed, to allow a needle 28 to penetrate though the exposed portion of the rubber plug member 3 as well as the underlying thin partition wall 14 so that the pointed end of the needle 28 reaches the mass of liquid. Thereafter, the bottle A is supported in the inverted state by suitable suspending means. Medical liquid contained in the bottle A can now be delivered for the desired use. In this connection, it should be noted that when the needle 28 is inserted within the inner space of the bottle A until a supporting member 29 for the needle abuts on the rubber plug 3, the needle 28 has a predetermined short length L as measured between the pointed end of the needle 28 and the partition wall 14. By virtue of this features, the pointed end of the needle 28 reaches only the neck portion of little volume than the drum portion of the bottle A. Accordingly, after using medical liquid, the bottle A has only a small quantity of liquid left below the level of the free end of the needle 28 because the neck portion as well as the lower chamber 16 is of extremely little volume. Thus, the liquid contained in the bottle A can be used economically without any appreciable waste.

As will be appreciated from the foregoing description, since the rubber plug member 3 is hermetically sealed in the plastic stopper assembly, there arises no necessity to clean the rubber plug with gauze impregrated with alcohol or the like for sterilization. Further, there is no danger of bleed possibly produced on the rubber plug being mixed and dissolved in the contents of the container. In case one of the inner stopper member having the partition wall provided with the pull ring as well as the score is formed of composite synthetic resin including polypropylene as base material and added with copolymer of ethylene and propylene and inorganic material such as calcium carbonate, the inner stopper member can withstand the temperature of ca. 120° C. for sterilization. Besides, the portion of the rubber plug into which the needle is to be inserted can be easily and reliably exposed by rupturing the corresponding portion of the partition wall merely by pulling the pull ring, to another advantage. Since the plastic bottle and the stopper assembly on one hand and the inner stopper member and the outer stopper member of the stopper assembly on the other hand are fused or welded together with each other, an improvement is attained in the hermetic sealing, whereby leakage of the liquid contents of the container during storage thereof as well as infiltration of foreign liquid upon sterilization can be positively excluded, to a further advantage. Additionally, by virtue of such a structure that the stopper assembly is secured onto the top edge of the mouth portion of the bottle so as to protrude outwardly, the medical liquid contained in the bottle can be used without waste. Although the partition wall of the lower inner stopper element is relatively thin, there is substantially no possibility of the partition wall being inadvertently ruptured under the influence of heat produced when the base portion of the stopper assembly is heat-sealed to the mouth portion of the bottle, because the partition wall is relatively far distanced from the base portion, whereby the liquid content is protected from the direct contact with the rubber plug in the non-used state of the container or bottle.

According to the inventive method of manufacturing the stopper assembly, the stopper assembly can be realized in an integral structure through successive processes in a simplified manner, which means that the stopper assembly as well as the medical liquid container hermetically sealed off by it can be manufactured on a mass production base in a facilitated manner. By virtue of the process in which the rubber plug member is at first accommodated within the lower chamber formed of the upper inner stopper element and subsequently the upper and the lower inner stopper elements are fitted and joined together so that the rubber plug member many be sealed in the inner stopper member, being followed by the welding or bonding the outer stopper member to such inner stopper member in the melted state, the rubber plug member does not directly undergo the injection pressure of the melted material for forming the outer stopper element. Thus, the danger of the partition wall immediately overlying the rubber plug being ruptured along the score under the injection pressure can be positively prevented. Further, the relatively thin partition wall underlying the rubber plug member is never subjected to rupture which might otherwise occur due to restoring expansion of the rubber plug contracted forcively under the injection pressure. In other words, the rubber plug member is protected from contraction due to the injection pressure and brings about no variation in the thickness of the underlying partition wall, which means that the latter can be realized in a uniform and reduced thickness to assure the facilitated insertion of the needle.

Although the invention has been described in conjunction with the preferred embodiment thereof illustrated in the drawings, it should be appreciated that the invention is never restricted to the illustration by many modifications and variations will readily occur to those skilled in the art without departing from the spirit and scope of the invention.

What is claimed is:

1. A stopper assembly for a medical liquid container, comprising an inner cylindrical stopper member formed of a plastic material, a rubber plug member hermetically contained in a chamber formed within said inner stopper member by first and second partition walls, said second partition wall being thinner than said first partition wall and sealing said rubber plug member from contact with a liquid in the container, said first partition wall being provided with an annular score, said second partition wall being formed at a position spaced from a base portion of the stopper assembly a distance sufficient enough to reduce heat transfer thereto from the base portion upon heat sealing thereof, an outer cylindrical stopper member formed of a plastic material and hermetically welded around and surrounding said inner stopper member, a pulling member formed in said first partition wall at a region enclosed by said annular score and being disposed and enclosed in the inner cylindrical stopper member; said outer stopper member having an inner flange formed at the top end thereof and an outer flange formed at the bottom end thereof, said inner flange covering the top end of said inner stopper member, said outer flange being welded to an outer flange formed at the bottom end of said inner stopper member, both of said outer flanges being hermetically welded to a top end of the mouth of said container.

2. A stopper assembly according to claim 1, wherein said inner stopper member includes a first inner stopper element having said first partition wall formed therein and a second inner stopper element having said second partition wall, said first and second inner stopper elements being hermetically joined together with abutting end portions being engaged each other so that said first and second partition walls define therebetween the chamber in which said rubber plug member is hermetically sealed.

3. A stopper assembly according to claim 2, wherein said first inner stopper element is formed of a plastic material which is composed of polypropylene as a main component and added with copolymer of ethylene and propylene and inorganic substance.

* * * * *